US010389114B2

(12) United States Patent
Matheson et al.

(10) Patent No.: US 10,389,114 B2
(45) Date of Patent: Aug. 20, 2019

(54) REGULATED TRANSFORMER RECTIFIER UNIT FOR AIRCRAFT SYSTEMS

(71) Applicant: The Boeing Company, Chicago, IL (US)

(72) Inventors: Evelyn Marie Matheson, Bothell, WA (US); Kamiar J. Karimi, Kirkland, WA (US); Mehdy Barekatein, Kirkland, WA (US); Eugene V. Solodovnik, Lake Stevens, WA (US); Sheverria Antony Aikens, Mill Creek, WA (US); Mark Eugene Liffring, Seattle, WA (US)

(73) Assignee: The Boeing Company, Chicago, IL (US)

( * ) Notice: Subject to any disclaimer, the term of this patent is extended or adjusted under 35 U.S.C. 154(b) by 465 days.

(21) Appl. No.: 14/553,604

(22) Filed: Nov. 25, 2014

(65) Prior Publication Data

US 2016/0144974 A1 May 26, 2016

(51) Int. Cl.
*H02J 1/10* (2006.01)

(52) U.S. Cl.
CPC .................................... *H02J 1/10* (2013.01)

(58) Field of Classification Search
CPC .............. H02J 1/10; B64D 41/00; H02M 7/02
See application file for complete search history.

(56) References Cited

U.S. PATENT DOCUMENTS 4,866,591 A 9/1989 Cook et al.
5,311,419 A * 5/1994 Shires ................. H02M 1/4216 363/129
5,322,725 A * 6/1994 Ackerman ................ B64C 1/40 428/137
6,256,213 B1 * 7/2001 Illingworth ....... H02M 3/33576 363/126
6,741,483 B1 * 5/2004 Stanley ............... H02M 7/4807 330/9
6,950,322 B2 * 9/2005 Ferens .................. H02M 3/335 363/44
7,826,240 B2 * 11/2010 Xu ........................ H02M 7/217 363/142
2002/0144163 A1 * 10/2002 Goodfellow ............ H02J 1/102 713/300

(Continued)

OTHER PUBLICATIONS

Karimi et al., "Electrical Power System Stability," U.S. Appl. No. 13/938,588, filed Jul. 10, 2013, 62 pages.

(Continued)

*Primary Examiner* — Jared Fureman
*Assistant Examiner* — Emmanuel Dominique
(74) *Attorney, Agent, or Firm* — Yee & Associates, P.C.

(57) ABSTRACT

A method and apparatus for providing regulated direct current power for a direct current load on an aircraft. A regulated transformer rectifier unit on an aircraft comprises a plurality of converter modules connected in parallel between an input and an output. Each converter module in the plurality of converter modules comprises a transformer rectifier unit. The plurality of converter modules are controlled by a controller to provide regulated direct current power at the output from alternating current power provided at the input from an alternating current power source on the aircraft.

16 Claims, 13 Drawing Sheets

(56) References Cited

U.S. PATENT DOCUMENTS

| | | | | |
|---|---|---|---|---|
| 2004/0159118 A1* | 8/2004 | Hu | B64D 13/00 | 62/434 |
| 2004/0202012 A1* | 10/2004 | Ferens | H02M 3/335 | 363/65 |
| 2006/0168968 A1* | 8/2006 | Zielinski | F02C 7/262 | 60/778 |
| 2008/0062587 A1* | 3/2008 | Takaiwa | H02H 7/1213 | 361/18 |
| 2008/0100135 A1* | 5/2008 | Lazarovich | H02J 5/00 | 307/9.1 |
| 2012/0065790 A1 | 3/2012 | Boy | | |
| 2013/0229050 A1* | 9/2013 | Shipley | H02J 4/00 | 307/9.1 |
| 2014/0122050 A1 | 5/2014 | Fu et al. | | |
| 2015/0171890 A1* | 6/2015 | Pagnanelli | H03M 3/468 | 341/143 |
| 2015/0198130 A1* | 7/2015 | Dudley | F01D 19/00 | 290/38 R |

OTHER PUBLICATIONS

Karimi et al., "Stable Electrical Power System with Regulated Transformer Rectifier Unit," U.S. Appl. No. 14/553,520, filed Nov. 25, 2014, 61 pages.

Office Action, dated Mar. 15, 2017, regarding U.S. Appl. No. 14/553,520, 12 pages.

Areerak, "Modeling and Stability Analysis of Aircraft Power Systems", PhD Thesis, University of Nottingham, Oct. 2009, 249 pages.

Jusoh, "Active Dampening of DC Power Networks", PhD Thesis, University of Birmingham, Nov. 2003, 210 pages.

Song et al., "Load Effect on Switched Reluctance Starter/Generator System in Aircraft", International Journal of Electrical and Power Engineering, vol. 4, No. 1, Jan. 2010, pp. 19-26.

Notice of Allowance, dated May 8, 2017, regarding U.S. Appl. No. 14/553,520, 10 pages.

* cited by examiner

800

REGULATED TRANSFORMER RECTIFIER UNIT FOR AIRCRAFT SYSTEMS

BACKGROUND INFORMATION

1. Field

The present disclosure relates generally to electrical power systems and, in particular, to electrical power systems on aircraft. Still more particularly, the present disclosure relates to a regulated transformer rectifier unit for an electrical power system on an aircraft or other platform.

2. Background

Various systems and devices on an aircraft may use electrical power. For example, without limitation, electrical power may be used by a flight control system, in-flight entertainment systems, computers, actuators, lights, fans, pumps, or other systems and devices on an aircraft. Some systems and devices on an aircraft may use direct current, DC, power. Other systems and devices on an aircraft may use alternating current, AC, power. Electrical loads on an aircraft may include active loads and passive loads.

Electrical power for systems and devices on an aircraft may be provided by an electrical power system. An electrical power system on an aircraft may include various sources of electrical power and various structures for delivering electrical power from the electrical power sources to various systems and devices on the aircraft. An electrical power system on an aircraft may include a number of sources of AC power, a number of sources of DC power, or both. For example, without limitation, electrical power may be delivered from various power sources to various systems and devices that use electrical power on an aircraft via a number of buses. AC power may be provided from a number of AC power sources to systems and devices on the aircraft that use AC power via a number of AC buses on the aircraft. DC power may be provided from a number of DC power sources to systems and devices on the aircraft that use DC power via a number of DC buses on the aircraft.

AC power on an aircraft may be provided by a number of generators, by a number of other appropriate AC power sources, or by various combinations of AC power sources. Generators for providing AC power on an aircraft may be driven by the aircraft engines, in another appropriate manner, or in a combination of appropriate manners.

An AC-to-DC converter may be one example of a source of DC power on an aircraft. AC power may be converted to DC power by a number of AC-to-DC converters on an aircraft. For example, without limitation, an AC-to-DC converter may be configured to receive AC power provided on an AC bus on the aircraft by an AC power source and to provide DC power on a DC bus on the aircraft. An AC-to-DC converter on an aircraft may be configured to provide DC power at a desired voltage for use by various systems and devices on the aircraft from the AC power provided on the AC bus lines by the AC power source.

An AC-to-DC converter on an aircraft may be implemented as a transformer rectifier unit. A transformer rectifier unit comprises a transformer and a rectifier. For example, without limitation, a transformer in a transformer rectifier unit on an aircraft may be configured to transform a multiple-phase AC input signal provided by an AC power source to a multiple-phase AC output signal. The transformer may be configured to transform the voltage, phase, other characteristics, or various combinations of characteristics of the multiple-phase AC input signal received by the transformer to provide the multiple-phase AC output signal. The rectifier in the transformer rectifier unit may be configured to convert that multiple-phase AC output signal provided by the transformer in the transformer rectifier unit to a DC power signal.

It may be desirable that the quality of the DC power provided by an AC-to-DC converter on an aircraft is adequate under various operating conditions. It also may be desirable that an electrical power system including an AC-to-DC converter on an aircraft is stable. It also may be desirable that the weight of an AC-to-DC converter on an aircraft is reduced.

Therefore, it would be desirable to have a method and apparatus that take into account at least some of the issues discussed above, as well as other possible issues.

SUMMARY

An illustrative embodiment provides an apparatus on an aircraft comprising an input configured to receive alternating current power from an alternating current power source on the aircraft, an output, a plurality of converter modules connected in parallel between the input and the output, and a controller. Each converter module in the plurality of converter modules comprises a transformer rectifier unit. The controller is configured to control the plurality of converter modules to provide regulated direct current power at the output from the alternating current power at the input.

An illustrative embodiment also provides a method of providing regulated direct current power for a direct current load on an aircraft. A plurality of converter modules are controlled to provide regulated direct current power at an output from alternating current power at an input. The plurality of converter modules are connected in parallel between the input and the output. Each converter module in the plurality of converter modules comprises a transformer rectifier unit.

An illustrative embodiment also provides an apparatus comprising a plurality of regulated transformer rectifier units connected in parallel to provide regulated direct current power for a direct current load. Each of the plurality of regulated transformer rectifier units comprises an input configured to receive alternating current power from an alternating current power source, an output, a plurality of converter modules connected in parallel between the input and the output, and a controller. Each converter module in the plurality of converter modules comprises a transformer rectifier unit. The controller is configured to control the plurality of converter modules to provide the regulated direct current power at the output from the alternating current power at the input.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

Figure 1:
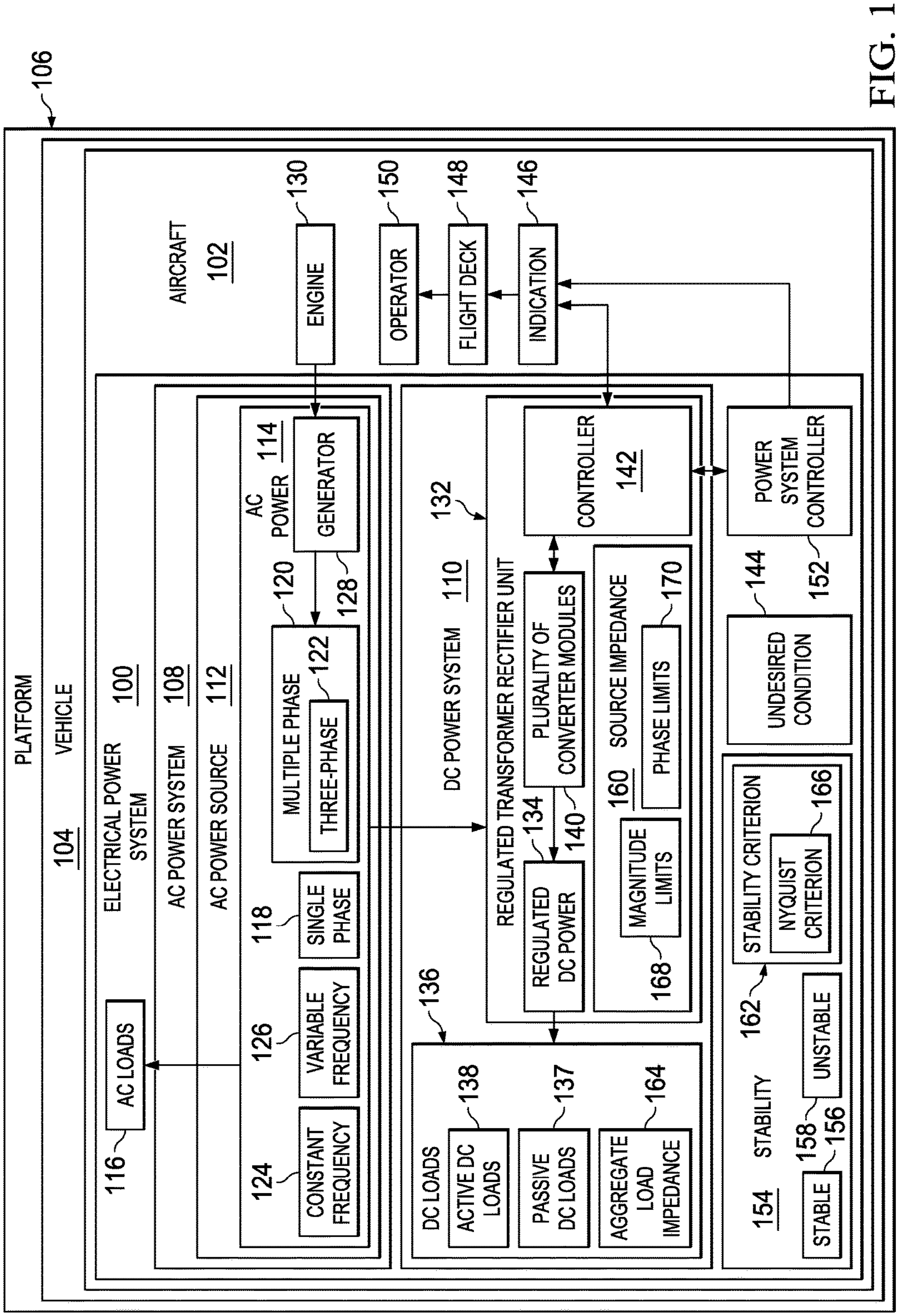
FIG. 1 is an illustration of a block diagram of an electrical power system on an aircraft in accordance with an illustrative embodiment.

Illustrative embodiments recognize and take into account a number of considerations. "A number," as used herein with reference to items, means one or more items. For example, "a number of different considerations" are one or more different considerations.

Illustrative embodiments recognize and take into account that newer commercial passenger aircraft and other aircraft may include more devices and systems that require DC power for operation. The overall demand for DC power by electrical loads may be increased on such aircraft. Illustrative embodiments recognize and take into account that it is desirable that sources of DC power on an aircraft are robust, provide good power quality comparable to existing industry standards, and are fault tolerant in order to maximize aircraft efficiency through reduced weight and improved reliability.

Illustrative embodiments recognize and take into account that current electrical power systems on commercial passenger aircraft and other aircraft may not utilize regulated AC-to-DC power conversion sources. Current DC power sources on aircraft may comprise unregulated AC-to-DC transformer-rectifier topologies. Such unregulated power sources may be relatively heavy. The performance of such power converters may be dependent on the performance of upstream AC power sources. The use of such power sources may require increased aircraft wire weight due to strict voltage drop limits for electrical load wiring.

Illustrative embodiments also recognize and take into account that the output performance of unregulated AC-to-DC power sources is influenced by the source and load characteristics and is therefore highly variable. The highly variable output of such unregulated DC power sources results in more severe operating conditions for load equipment.

Illustrative embodiments recognize and take into account that currently, protection against faults on a DC bus on an aircraft may be separated from the AC-to-DC power converter that is the source of power on the DC bus. In this case, the protection against faults on the DC bus may be more difficult to coordinate with other aircraft power system protections and may be more likely to allow latent problems to go unnoticed.

Illustrative embodiments provide a regulated transformer rectifier unit for providing regulated DC power for loads on an aircraft or other platform. A regulated transformer rectifier unit architecture in accordance with an illustrative embodiment includes topology, power quality, performance, and protection characteristics that provide an improved source of DC power for loads on an aircraft or other platform.

Illustrative embodiments may provide AC-to-DC power conversion on an aircraft or other platform with improved robustness and power quality performance. For example, a fault tolerant approach in accordance with an illustrative embodiment uses a plurality of parallel converters in a regulated transformer rectifier unit to achieve acceptable reliability as a DC power source for aircraft or other requirements. For example, AC-to-DC power conversion in accordance with an illustrative embodiment may improve overall reliability to meet aircraft and other appropriate requirements by providing higher power quality performance, thereby improving the reliability of downstream DC load equipment.

Illustrative embodiments may provide AC-to-DC power conversion on an aircraft with reduced weight. For example, without limitation, illustrative embodiments may allow for the weight of the wiring used in an electrical power system on an aircraft to be reduced.

Illustrative embodiments recognize and take into account that a regulated transformer rectifier unit may be used in an electrical power system on an aircraft or other platform that includes a number of constant and variable frequency generators as sources of AC power and a number of active and dynamic DC loads. These dynamic loads may include a variety of active switching power supplies that exhibit constant power load characteristics.

Illustrative embodiments recognize and take into account that there is a potential for instability in an electrical power system when active AC-to-DC power converters are integrated with dynamic AC power generation systems and active DC loads. Such converters have constant power characteristics that could result in system instability.

Illustrative embodiments recognize and take into account that filtering may be used to provide stability for an electrical power system. However, such filtering may increase the weight of the electrical power system on an aircraft.

Illustrative embodiments ensure the stability of an electrical power system including a regulated transformer rectifier unit providing regulated power for active and passive DC loads. For example, without limitation, illustrative embodiments may provide a stable electrical power system that meets the requirements for a commercial aircraft power system to work and provide acceptable power quality for aircraft loads including avionics and other aircraft systems.

Turning to FIG. 1, an illustration of a block diagram of an electrical power system on an aircraft is depicted in accordance with an illustrative embodiment. For example, without limitation, electrical power system 100 may provide electrical power for aircraft 102.

Aircraft 102 may be a commercial passenger aircraft, a cargo aircraft, a private or personal aviation aircraft, a military aircraft, or any other appropriate type of aircraft that may be used for any appropriate purpose. Aircraft 102 may be a fixed wing, rotary wing, or lighter-than-air aircraft. Aircraft 102 may comprise a manned aircraft or an unmanned aerial vehicle.

Aircraft 102 is an example of vehicle 104. Illustrative embodiments may be implemented in electrical power system 100 for providing electrical power on vehicle 104 other than aircraft 102. Vehicle 104 may comprise any vehicle configured for operation in the air, in space, on land, on water, under water, or in any other medium or combinations of media.

Vehicle 104 is an example of platform 106. Illustrative embodiments may be implemented in electrical power system 100 for providing electrical power on platform 106 other than vehicle 104. For example, without limitation, platform 106 may be a building, an oil rig, or any other appropriate mobile or fixed platform.

Electrical power system 100 may include alternating current (AC) power system 108 and direct current (DC) power system 110. AC power system 108 and DC power system 110 may be referred to as subsystems of electrical power system 100.

AC power system 108 comprises AC power source 112. AC power source 112 may comprise any appropriate number of sources for providing AC power 114 for AC loads 116. AC power source 112 may provide single-phase 118 or multiple-phase 120 AC power 114. For example, without limitation, AC power source 112 may provide three-phase 122 AC power 114. Alternatively, AC power source 112 may provide multiple-phase 120 AC power 114 having fewer or more than three phases. AC power source 112 may provide constant frequency 124 or variable frequency 126 AC power 114. For example, without limitation, the frequency of variable frequency 126 AC power 114 may vary from between approximately 350 Hz to approximately 1000 Hz or over any other appropriate range of frequencies.

AC power source 112 may comprise any appropriate source of AC power. For example, without limitation, AC power source 112 may comprise generator 128. For example, without limitation, generator 128 on aircraft 102 may be driven by engine 130 of aircraft 102.

DC power system 110 may comprise regulated transformer rectifier unit 132. Regulate transformer rectifier unit 132 is configured to convert AC power 114 from AC power source 112 to regulated DC power 134 for DC loads 136. For example, without limitation, the voltage level of AC power 114 provided from AC power source 112 to regulated transformer rectifier unit 132 may be the voltage level provided by an AC power source on aircraft 102, such as approximately 100 volts root mean square (RMS) to approximately 300 volts RMS, or another appropriate AC voltage level or range of AC voltage levels. For example, without limitation, regulated transformer rectifier unit 132 may be configured to provide regulated DC power 134 having a voltage level that satisfies standards for DC power provided on aircraft 102, such as approximately 18 volts to approximately 40 volts, approximately 38 volts to approximately 60 volts, or another appropriate DC voltage level or range of DC voltage levels.

DC loads 136 may comprise a number of loads on aircraft 102, vehicle 104, or platform 106. DC loads 136 may include any system or device that is configured to use DC power. For example, without limitation, DC loads 136 on aircraft 102 may include instruments, controls, motors, other systems or devices, or various combinations of systems and devices on aircraft 102 that use DC power.

DC loads 136 may include passive DC loads 137, active DC loads 138, or any appropriate number and combination of passive DC loads 137 and active DC loads 138. DC loads 136 may have resistive power characteristics, inductive power characteristics, or capacitive power characteristics. Active DC loads 138 may comprise DC-to-DC converters or other active switching power supplies and have constant power characteristics. For example, without limitation, active DC loads 138 may be configured to draw a relatively constant level of DC power from a DC power source as the voltage level of the DC power provided by the DC power source varies over a certain range.

Regulated transformer rectifier unit 132 may comprise plurality of converter modules 140 and controller 142. Controller 142 may be configured to control plurality of converter modules 140 to provide regulated DC power 134 for DC loads 136 from AC power 114 provided by AC power source 112.

Controller 142 also may be configured to identify undesired condition 144. Undesired condition 144 may include any condition in one or more of plurality of converter modules 140, elsewhere in regulated transformer rectifier unit 132, or both, that may affect the operation of regulated transformer rectifier unit 132 in an undesired manner. Controller 142 may be configured to control plurality of converter modules 140 in an appropriate manner in response to identifying undesired condition 144. For example, without limitation, controller 142 may be configured to shut down one of plurality of converter modules 140 in which undesired condition 144 is identified while controlling the rest of plurality of converter modules to continue to provide regulated DC power 134 for DC loads 136 in an uninterrupted manner.

Controller 142 also may be configured to provide indication 146 in response to identifying undesired condition 144 in any of plurality of converter modules 140 or elsewhere in regulated transformer rectifier unit 132. For example, without limitation, indication 146 may be provided for display or otherwise presented on flight deck 148 to operator 150 of aircraft 102. Operator 150 may take appropriate action in response to indication 146. For example, without limitation, operator 150 may notify appropriate maintenance personnel or take other appropriate action in response to indication 146 indicating undesired condition 144 in regulated transformer rectifier unit 132.

Controller 142 for regulated transformer rectifier unit 132 also may be configured to communicate with power system controller 152. Power system controller 152 may include any appropriate combination of systems and devices for controlling components of electrical power system 100 that are not controlled by controller 142 for regulated transformer rectifier unit 132. For example, without limitation, communication may be provided between controller 142 for regulated transformer rectifier unit 132 and power system controller 152 to provide for a coordinated response to protect electrical power system 100 when undesired condition 144 is identified. Indication 146 may be provided directly from controller 142 to flight deck 148, via power system controller 152, or both.

Electrical power system 100 may be characterized by stability 154. Stability 154 may be defined by the ability of electrical power system 100 to retain or regain a normal state of equilibrium during normal operation and after being subjected to a disturbance. Electrical power system 100 that retains or regains a normal state of equilibrium may be characterized as stable 156. Electrical power system 100 that does not retain a normal state of equilibrium during normal operation or that does not regain a normal state of equilibrium after being subjected to a disturbance may be characterized as unstable 158. Stability 154 may refer to the stability of AC power system 108, DC power system 110, or both. In any case, it is desirable that electrical power system 100 is stable 156.

In accordance with an illustrative embodiment, stability 154 for electrical power system 100 may be provided by regulated transformer rectifier unit 132 having source impedance 160 that is determined based on stability criterion 162 and aggregate load impedance 164 of DC loads 136 provided power by regulated transformer rectifier unit 132. For example, without limitation, stability criterion 162 may include Nyquist criterion 166 or any other appropriate criterion for determining source impedance 160 for regulated transformer rectifier unit 132 providing power for DC loads 136 having aggregate load impedance 164 that will result in electrical power system 100 that is stable 156. For example, without limitation, stability criterion 162 may be used to determine magnitude limits 168 and phase limits 170 for source impedance 160 for regulated transformer rectifier unit 132 based on identified aggregate load impedance 164 for DC loads 136. For example, without limitation, source impedance 160 may provide a phase margin of approximately 30 degrees and a gain margin of approximately 6 dB over a frequency range of approximately 1 Hz to approximately 10 kHz.

Figure 2:
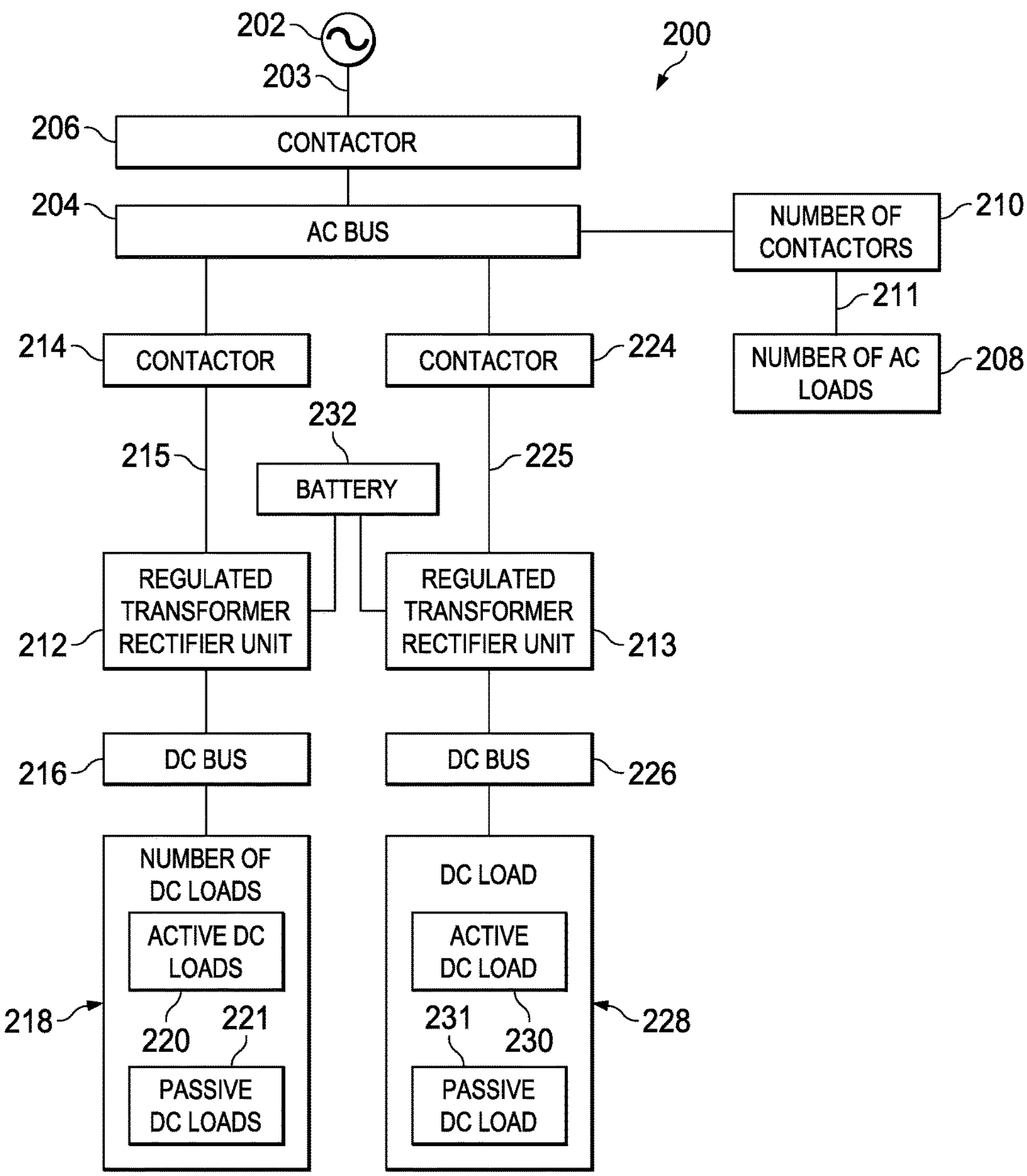
FIG. 2 is an illustration of a block diagram of an electrical power system in accordance with an illustrative embodiment.

Turning to FIG. 2, an illustration of a block diagram of an electrical power system is depicted in accordance with an illustrative embodiment. Electrical power system 200 may be an example of one implementation of electrical power system 100 in FIG. 1.

Electrical power system 200 may include generator 202. For example, generator 202 may be driven by an engine on an aircraft. For example, without limitation, generator 202 may generate variable frequency three-phase AC power or other AC power. Generator feeder lines 203 may carry the generated AC power from generator 202 to AC bus 204.

Contactor 206 may be provided on generator feeder lines 203. Contactor 206 may comprise any appropriate type of circuit breaker or other device that may be configured to disconnect AC bus 204 from generator 202 when contactor 206 is opened. Generator 202 may be connected to AC bus 204, to provide AC power to AC bus 204 on lines 203, when contactor 206 is closed.

AC bus 204 may be configured to distribute the AC power provided by generator 202 to various loads. For example, without limitation, AC bus 204 may be configured to distribute the AC power provided by generator 202 to number of AC loads 208. For example, number of AC loads 208 may include various loads on an aircraft that use AC electrical power.

Number of contactors 210 may be provided on load feeder lines 211 connecting AC bus 204 to number of AC loads 208. Number of contactors 210 may comprise any appropriate type of circuit breakers or other devices that may be configured to disconnect load feeder lines 211 and number of AC loads 208 from AC bus 204 when number of contactors 210 is opened. AC bus 204 may be connected to number of AC loads 208, to provide AC power to number of AC loads 208 on load feeder lines 211, when number of contactors 210 is closed.

AC bus 204 may be configured to distribute the AC power provided by generator 202 to regulated transformer rectifier unit 212 and regulated transformer rectifier unit 213. Regulated transformer rectifier unit 212 and regulated transformer rectifier unit 213 may be configured to convert the AC power provided by AC bus 204 to regulated DC power.

Contactor 214 may be provided on feeder lines 215 connecting AC bus 204 to regulated transformer rectifier unit 212. Contactor 214 may comprise any appropriate type of circuit breaker or other device that may be configured to disconnect feeder lines 215 and regulated transformer rectifier unit 212 from AC bus 204 when contactor 214 is opened. AC bus 204 may be connected to regulated transformer rectifier unit 212 to provide AC power to regulated transformer rectifier unit 212 on feeder lines 215 when contactor 214 is closed.

Regulated DC power from regulated transformer rectifier unit 212 may be provided on DC bus 216. DC bus 216 may be configured to distribute regulated DC power from regulated transformer rectifier unit 212 to number of DC loads 218. For example, without limitation, number of DC loads 218 may include active DC loads 220, passive DC loads 221, or any appropriate number and combination of active DC loads 220 and passive DC loads 221.

Contactor 224 may be provided on feeder lines 225 connecting AC bus 204 to regulated transformer rectifier unit 213. Contactor 224 may comprise any appropriate type of circuit breaker or other device that may be configured to disconnect feeder lines 225 and regulated transformer rectifier unit 213 from AC bus 204 when contactor 224 is opened. AC bus 204 may be connected to regulated transformer rectifier unit 213 to provide AC power to regulated transformer rectifier unit 213 on feeder lines 225 when contactor 224 is closed.

Regulated DC power from regulated transformer rectifier unit 213 may be provided on DC bus 226. DC bus 226 may be configured to distribute regulated DC power from regulated transformer rectifier unit 213 to DC load 228. For example, without limitation, DC load 228 may comprise active DC load 230 or passive DC load 231.

An electrical power system in accordance with an illustrative embodiment may comprise more or fewer than two regulated transformer rectifier units. Regulated transformer rectifier unit 212 and regulated transformer rectifier unit 213 may be connected in parallel to provide regulated DC power on a single DC bus or to a single DC load or group of DC loads. In this case, regulated DC power may be provided to the DC load or loads in an uninterrupted manner by one of regulated transformer rectifier unit 212 or regulated transformer rectifier unit 213 if the other one of regulated transformer rectifier unit 212 or regulated transformer rectifier unit 213 is shut down due to the occurrence of an undesired condition or for some other reason.

Electrical power system 200 may include battery 232. For example, without limitation, battery 232 may be configured to provide DC power for hold-up circuitry in one or both of regulated transformer rectifier unit 212 and regulated transformer rectifier unit 213.

Figure 3:
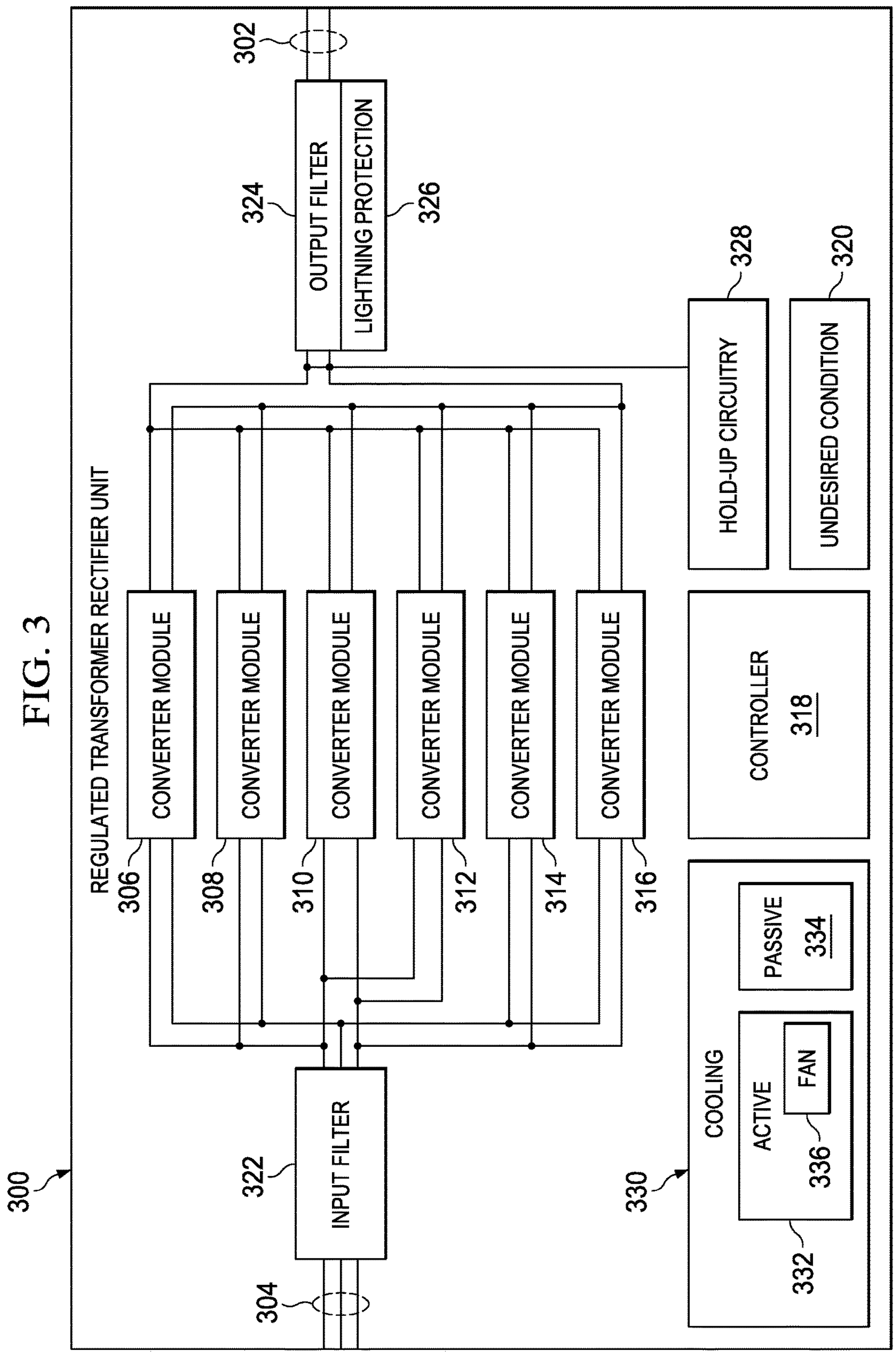
FIG. 3 is an illustration of a block diagram of a regulated transformer rectifier unit in accordance with an illustrative embodiment.

Turning to FIG. 3, an illustration of a block diagram of a regulated transformer rectifier unit is depicted in accordance with an illustrative embodiment. Regulated transformer rectifier unit 300 may be an example of one implementation of regulated transformer rectifier unit 132 in FIG. 1.

Regulated transformer rectifier unit 300 is configured to provide regulated DC power at output 302 from AC power provided at input 304. Regulated transformer rectifier unit 300 comprises converter modules 306, 308, 310, 312, 314, and 316. A regulated transformer rectifier unit in accordance with an illustrative embodiment may have more or fewer than six converter modules.

Controller 318 is configured to control converter modules 306, 308, 310, 312, 314, and 316 to provide regulated DC power at output 302 from AC power provided at input 304. Controller 318 also may be configured to identify undesired condition 320 in one or more of converter modules 306, 308, 310, 312, 314, and 316 or elsewhere in regulated transformer rectifier unit 300. Controller 318 may be configured to control converter modules 306, 308, 310, 312, 314, and 316 in an appropriate manner in response to identifying undesired condition 320 and take other appropriate action in response to identifying undesired condition 320.

Input filter 322 may be connected between input 304 and converter modules 306, 308, 310, 312, 314, and 316. Output filter 324 may be connected between converter modules 306, 308, 310, 312, 314, and 316 and output 302. Input filter 322 and output filter 324 may be configured to reduce switching noise. For example, without limitation, input filter 322 and the output filter 324 may comprise electromagnetic interference filters configured to reduce switching noise.

Regulated transformer rectifier unit 300 may include lightning protection 326. Lightning protection 326 may be implemented in any appropriate manner to protect regulated transformer rectifier unit from lightning. For example, without limitation, lightning protection 326 may be implemented as part of output filter 324 or separate from output filter 324.

Regulated transformer rectifier unit 300 may include hold-up circuitry 328. Hold-up circuitry 328 may be configured to operate with power provided from a battery to provide DC power at output 302 of regulated transformer rectifier unit 300 when AC power at input 304 is interrupted. For example, without limitation, hold-up circuitry 328 may be configured to use power from an appropriate battery power source to restore the DC power provided at output 302 to the level provided before an interruption of AC power at input 304 within approximately 10 milliseconds following the interruption of AC power at input 304.

Regulated transformer rectifier unit 300 may include cooling 330. Cooling 330 may be both active 332 and passive 334. For example, without limitation, active 332 cooling 330 may be provided by fan 336.

Figure 4:
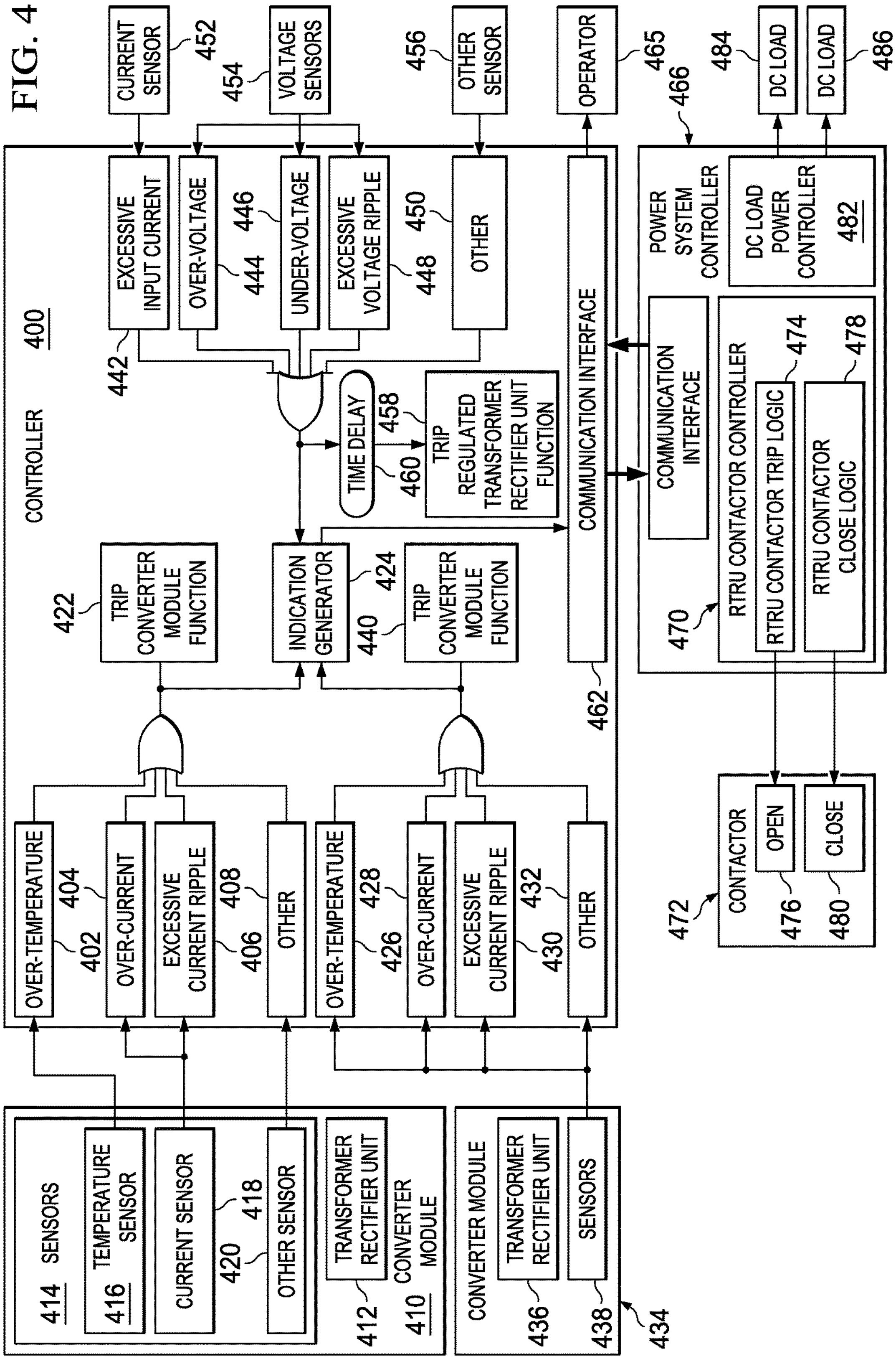
FIG. 4 is an illustration of a block diagram of a controller for a regulated transformer rectifier unit in accordance with an illustrative embodiment.

Turning to FIG. 4, an illustration of a block diagram of a controller for a regulated transformer rectifier unit is depicted in accordance with an illustrative embodiment. Controller 400 may be an example of one implementation of controller 142 in FIG. 1.

Controller 400 may be configured to identify various undesired conditions in converter modules that are controlled by controller 400. For example, controller 400 may be configured to identify over-temperature 402, over-current 404, excessive current ripple 406, and other 408 undesired conditions in converter module 410. Converter module 410 may comprise transformer rectifier unit 412 and sensors 414. For example, without limitation, transformer rectifier unit 412 may comprise a delta-connected line-to-line rectifier or any other appropriate transformer and rectifier structure. Sensors 414 may include any appropriate sensors for identifying conditions in converter module 410 from which controller 400 may identify whether an undesired condition has occurred. For example, without limitation, sensors 414 may include temperature sensor 416, current sensor 418, other sensor 420, or various combinations of appropriate sensors.

Controller 400 may be configured to perform trip converter module function 422 in response to identifying any one or more of over-temperature 402, over-current 404, excessive current ripple 406, or other 408 undesired condition in converter module 410. Trip converter module function 422 may be configure to shut down converter module 410 in response to identifying any one or more of over-temperature 402, over-current 404, excessive current ripple 406, or other 408 undesired condition. Indication generator 424 may be configured to generate an appropriate indication in response to the identification of any one or more of over-temperature 402, over-current 404, excessive current ripple 406, or other 408 undesired condition in converter module 410.

Controller 400 may be configured to identify over-temperature 426, over-current 428, excessive current ripple 430, and other 432 undesired condition in converter module 434. Converter module 434 may comprise transformer rectifier unit 436 and sensors 438. For example, without limitation, transformer rectifier unit 436 may comprise a delta-connected line-to-line rectifier or any other appropriate transformer and rectifier structure. Sensors 438 may include any appropriate sensors for identifying conditions in converter module 434 from which controller 400 may identify whether an undesired condition has occurred.

Controller 400 may be configured to perform trip converter module function 440 in response to identifying any one or more of over-temperature 426, over-current 428, excessive current ripple 430, or other 432 undesired condition in converter module 434. Trip converter module function 440 may be configure to shut down converter module 434 in response to identifying any one or more of over-temperature 426, over-current 428, excessive current ripple 430, or other 432 undesired condition. Indication generator 424 may be configured to generate an appropriate indication in response to the identification of any one or more of over-temperature 426, over-current 428, excessive current ripple 430, or other 432 undesired condition in converter module 434.

A controller in accordance with an illustrative embodiment may be configured to identify undesired conditions in more than two converter modules controlled by the controller. Controller 400 also may be configured to identify various undesired conditions in the regulated transformer rectifier unit as a whole. For example, controller 400 may be configured to identify excessive input current 442, over-voltage 444, under-voltage 446, excessive voltage ripple 448, and other 450 undesired condition in the regulated transformer rectifier unit. Appropriate sensors may be used for identifying conditions in the transformer rectifier unit from which controller 400 may identify whether an undesired condition has occurred. For example, without limitation, current sensor 452, voltage sensors 454, other sensor 456, or various combinations of appropriate sensors may be used to identify undesired conditions in the regulated transformer rectifier unit.

Controller 400 may be configured to perform trip regulated transformer rectifier unit function 458 in response to identifying any one or more of excessive input current 442, over-voltage 444, under-voltage 446, excessive voltage ripple 448, and other 450 undesired condition in the regulated transformer rectifier unit. Trip regulated transformer rectifier unit function 458 may be configured to shut down the regulated transformer rectifier unit in response to identifying any one or more of excessive input current 442, over-voltage 444, under-voltage 446, excessive voltage ripple 448, and other 450 undesired condition. Trip regulated transformer rectifier unit function 458 may be initiated after time delay 460 following the identification of any one or more of excessive input current 442, over-voltage 444, under-voltage 446, excessive voltage ripple 448, and other 450 undesired condition in the regulated transformer rectifier unit. Indication generator 424 may be configured to generate an appropriate indication in response to the identification of any one or more of excessive input current 442, over-voltage 444, under-voltage 446, excessive voltage ripple 448, and other 450 undesired condition in the regulated transformer rectifier unit.

Controller 400 may comprise communication interface 462. For example, without limitation, communication interface 462 may be configured to provide indications generated by indication generator 424 to operator 465.

Alternatively, or in addition, communication interface 462 may be configured to provide for the exchange of information between controller 400 and power system controller 466. For example, without limitation, an indication that the regulated transformer rectifier unit is tripped may be provided to regulated transformer rectifier unit contactor controller 470 for controlling contactor 472. In this case, regulated transformer rectifier unit contactor trip logic 474 in regulated transformer rectifier unit contactor controller 470 may open 476 contactor 472 when the regulated transformer rectifier unit is tripped. An indication from controller 400 that the undesired condition in the regulated transformer rectifier unit is cleared may cause regulated transformer rectifier unit contactor close logic 478 in regulated transformer rectifier unit contactor controller 470 to close 480 contactor 472. As another example, DC load power controller 482 may respond to an indication of an undesired condition in the regulated transformer rectifier unit to reduce the power provided to DC load 484 and DC load 486.

Figure 5:
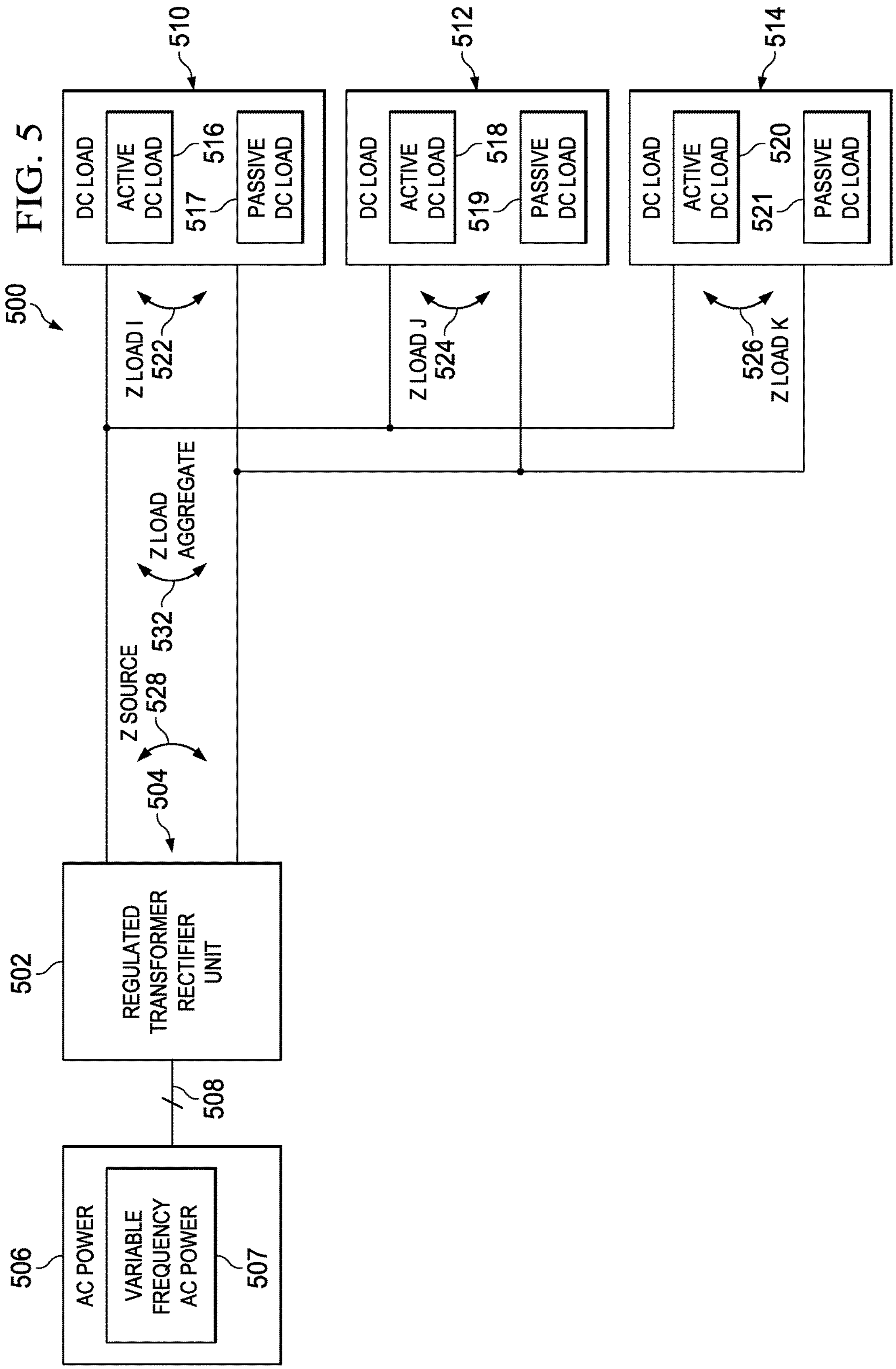
FIG. 5 is an illustration of a block diagram of a direct current electrical power system with a regulated transformer rectifier unit in accordance with an illustrative embodiment.

Turning to FIG. 5, an illustration of a block diagram of a direct current electrical power system with a regulated transformer rectifier unit is depicted in accordance with an illustrative embodiment. DC power system 500 may be an example of one implementation of DC power system 110 in FIG. 1.

Regulated transformer rectifier unit 502 is configured to provide regulate DC power at output 504 from AC power 506 provided on lines 508. For example, without limitation, AC power 506 may comprise variable frequency AC power 507.

Regulated DC power from regulated transformer rectifier unit 502 may be provided to DC load 510, DC load 512, and DC load 514. Each of DC load 510, DC load 512, and DC load 514 may comprise an active DC load or a passive DC load. For example, DC load 510 may comprise active DC load 516 or passive DC load 517. DC load 512 may comprise active DC load 518 or passive DC load 519. DC load 514 may comprise active DC load 520 or passive DC load 521. Each of DC load 510, DC load 512, and DC load 514 may have a constant power characteristic, a resistive power characteristic, an inductive power characteristic, or a capacitive power characteristic. DC loads 510, 512, and 514 may have the same power characteristics or different power characteristics, in these examples.

Regulated transformer rectifier unit 502 is the source of DC power in DC power system 500. In this example, source impedance 528, Zsource, of regulated transformer rectifier unit 502 may be determined at output 504 of regulated transformer rectifier unit 502.

DC loads 510, 512, and 514 are loads in DC power system 500. In this example, load impedance 522, Zloadi, of DC load 510 may be determined at the input to DC load 510. Load impedance 524, Zloadj, of DC power load 512 may be determined at the input to DC load 512. Load impedance 526, Zloadk, of DC load 514 may be determined at the input to DC load 514. Aggregate load impedance 532, Zloadaggregate, is the aggregate impedance of DC loads 510, 512, and 514.

Middlebrook criterion may be used for stability analysis. The Middlebrook criterion states that if source impedance Zsource is sufficiently lower than load impedance Zload in an electrical power system, then the electrical power system is stable. The Middlebrook criterion should be met for all frequencies, for all load combinations, and for all operating modes of the electrical system loads to ensure electrical power system stability. However, in some complex electrical power systems, source and load impedances may intersect at some frequency points. For example, without limitation, an electrical power system that is optimally designed for weight and volume may not necessarily meet classical Middlebrook criterion. Therefore, a variation of the Middlebrook criterion based on Nyquist criterion may be used to evaluate the stability of an electrical power system in accordance with illustrative embodiments.

The illustrations of FIGS. 1-5 are not meant to imply physical or architectural limitations to the manner in which illustrative embodiments may be implemented. Other components in addition to or in place of the ones illustrated may be used. Some components may be optional. Also, blocks are presented in the figures to illustrate some functional components. One or more of these blocks may be combined, divided, or combined and divided into different blocks when implemented in an illustrative embodiment.

Figure 6:
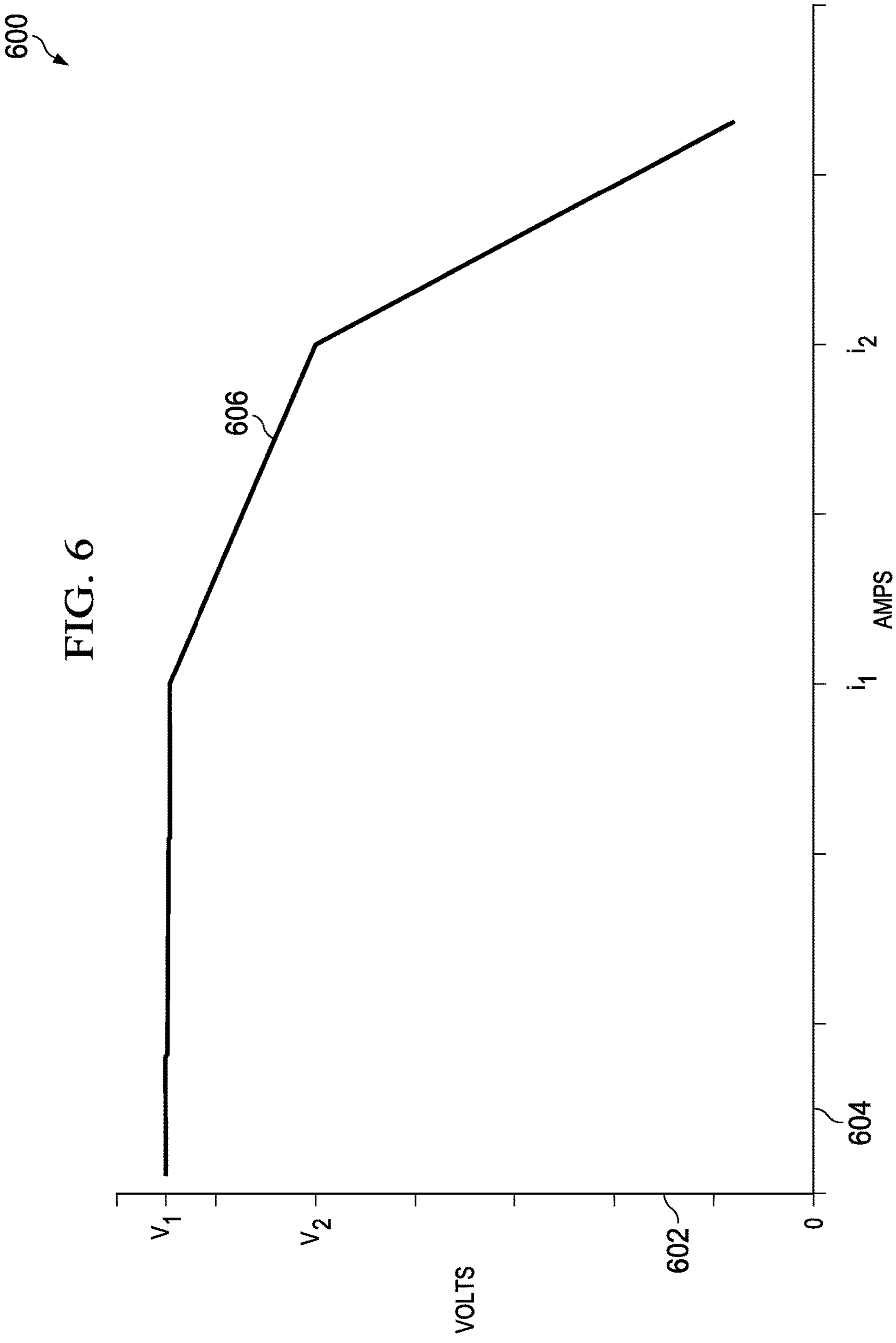
FIG. 6 is an illustration of an output regulation curve for a regulated transformer rectifier unit in accordance with an illustrative embodiment.

Turning to FIG. 6, an illustration of an output regulation curve for a regulated transformer rectifier unit is depicted in accordance with an illustrative embodiment. Graph 600 may indicate an example of output voltage versus current for, for example, without limitation, regulated transformer rectifier unit 132 in FIG. 1, regulated transformer rectifier unit 212 or 213 in FIG. 2, or regulated transformer rectifier unit 300 in FIG. 3.

Voltage is indicated in volts on vertical axis 602 of graph 600. Current is indicated in amps on horizontal axis 604 of graph 600. Curve 606 in graph 600 indicates an example of the relationship between output voltage and output current for a regulated transformer rectifier unit in accordance with an illustrative embodiment.

In this example, output voltage is regulated at a relatively constant level of $v_1$ volts for output current up to approximately $i_1$ amps. Output voltage drops from $v_1$ volts to $v_2$ volts as output current increases from $i_1$ amps to $i_2$ amps. For example, without limitation, output voltage levels from approximately $v_1$ volts to approximately $v_2$ volts may be considered acceptable. Illustrative embodiments thus may provide acceptable voltage levels over a relatively wide range of currents. The output voltage may drop below $v_2$ volts for output current greater than $i_2$ amps.

A regulated transformer rectifier unit in accordance with an illustrative embodiment preferably may be configured to source output current up to overload current levels with minimum voltage droop. A regulated transformer rectifier unit in accordance with an illustrative embodiment preferably is configured to source a relatively high short circuit current into a low impedance fault for a sufficient amount of time to enable coordinated fault clearing downstream of the regulated transformer rectifier unit output. For example, without limitation, a regulated transformer rectifier unit comprising six converter modules or another appropriate number of converter modules in accordance with an illustrative embodiment may be configured to source a minimum and stable short circuit current of at least approximately 600 amps or another appropriate amount of fault current for approximately 1 second or another appropriate amount of time to enable coordinated clearing of a fault downstream from the output of the regulated transformer rectifier unit.

Figure 7:
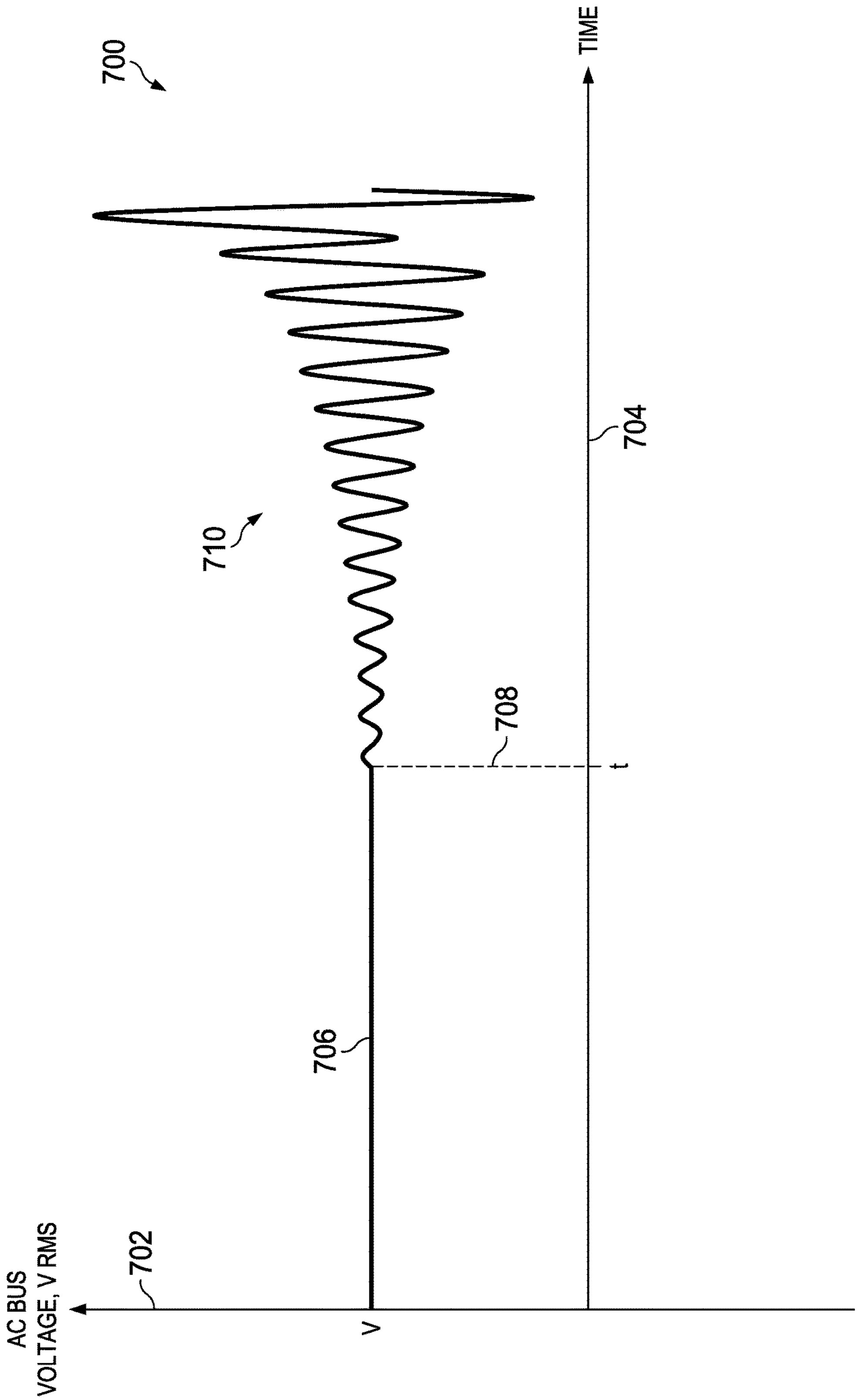
FIG. 7 is an illustration of a waveform diagram of bus voltage in an unstable electrical power system.

Turning to FIG. 7, an illustration of a waveform diagram of bus voltage in an unstable electrical power system is depicted. In this example, waveform 700 illustrates root mean square AC bus voltage over time in an electrical power system. The magnitude of root mean square AC bus voltage is indicated on vertical axis 702. Time is indicated on horizontal axis 704.

In this example, the AC bus voltage is locally stable around steady state equilibrium voltage level V 706 prior to time t 708. The AC bus voltage may become unstable when the electrical power system is subjected to an event at time t 708 that may trigger transition of the electrical power system into an unstable region of operation 710. Such an event may be transient in nature. For example, without limitation, events that may trigger such a transition to an unstable region of operation may include application or removal of active or passive loads on either AC or DC busses in the electrical power system, sudden changes in AC bus frequency, power system reconfigurations with subsequent changes in loading due to power transfers, or other events or combinations of events occurring in the electrical power system. Such events may be normal or abnormal. Normal events may be the result of normal operation of the electrical power system. Abnormal events may be the result of operation of the electrical power system under failure conditions.

Unstable operation of an electrical power system may lead to damage of electrical power system equipment, protective shutdown of the electrical power system, or both. Illustrative embodiments provide a system and method for providing power for DC loads by a regulated transformer rectifier unit which ensures that the power system is stable under all possible normal and abnormal operating conditions.

Figure 8:
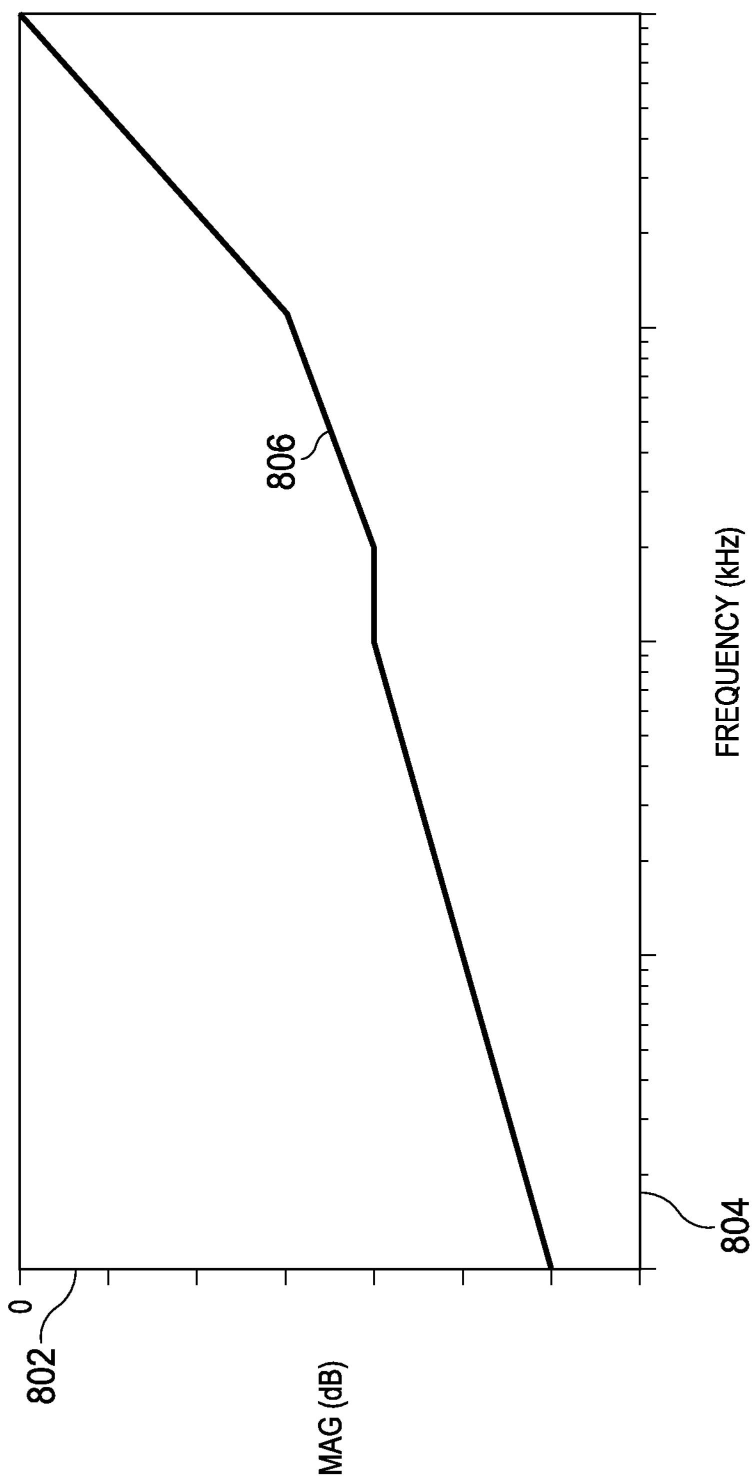
FIG. 8 is an illustration of source impedance magnitude limits for a regulated transformer rectifier unit in accordance with an illustrative embodiment.

Turning to FIG. 8, an illustration of source impedance magnitude limits for a regulated transformer rectifier unit is depicted in accordance with an illustrative embodiment. Graph 800 may indicate an example of magnitude limits 168 for source impedance 160 of regulated transformer rectifier unit 132 in FIG. 1.

Magnitude is indicated in decibels on vertical axis 802 of graph 800. Frequency is indicated in kilohertz with a logarithmic scale on horizontal axis 804 of graph 800. Line 806 in graph 800 indicates an example of maximum source impedance magnitude versus frequency for a regulated transformer rectifier unit in accordance with an illustrative embodiment.

Figure 9:
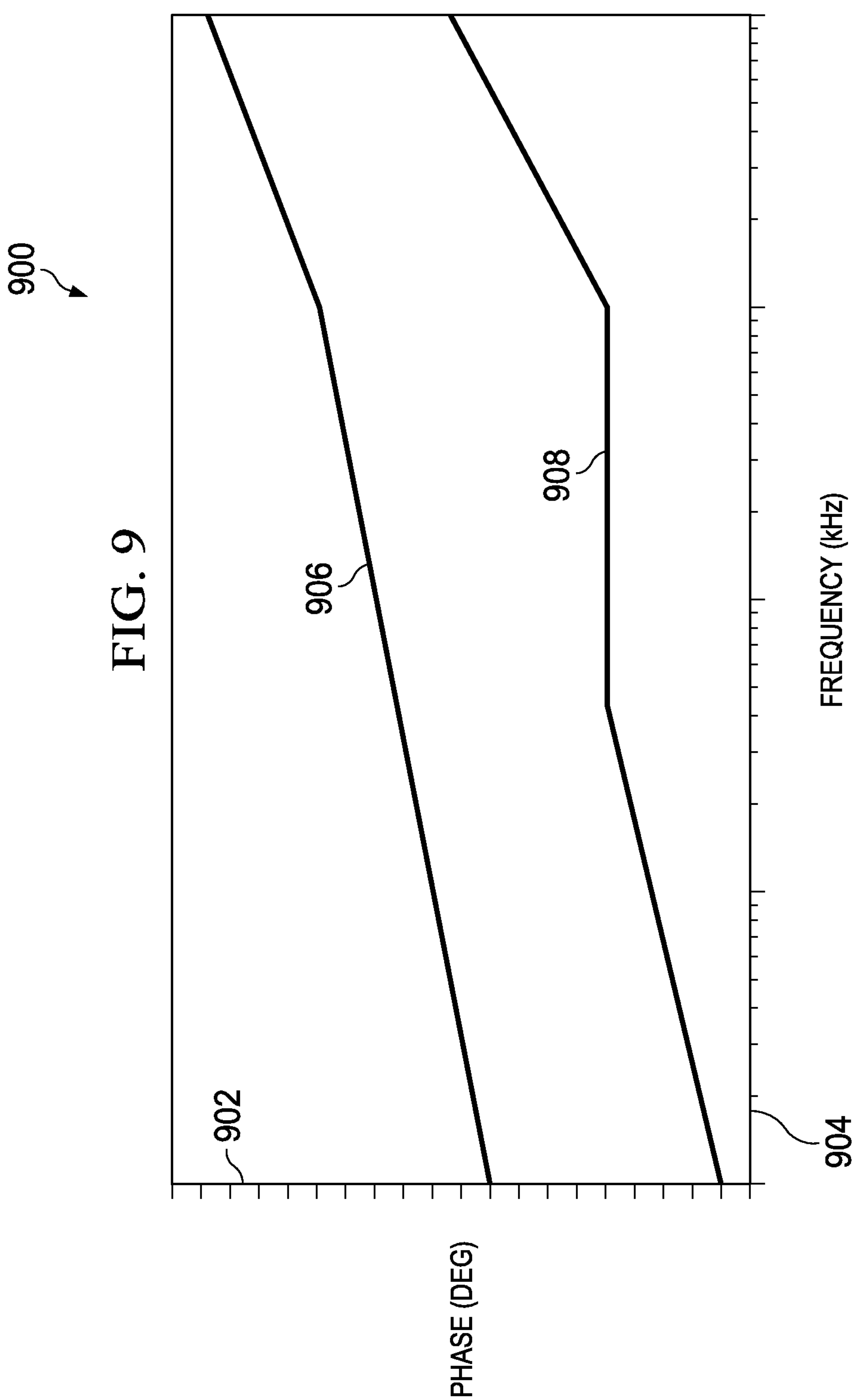
FIG. 9 is an illustration of source impedance phase limits for a regulated transformer rectifier unit in accordance with an illustrative embodiment.

Turning to FIG. 9, an illustration of source impedance phase limits for a regulated transformer rectifier unit is depicted in accordance with an illustrative embodiment. Graph 900 may indicate an example of phase limits 170 for source impedance 160 of regulated transformer rectifier unit 132 in FIG. 1.

Phase is indicated in degrees on vertical axis 902 of graph 900. Frequency is indicated in kilohertz with a logarithmic scale on horizontal axis 904 of graph 900. Source impedance phase boundaries for a regulated transformer rectifier unit in accordance with an illustrative embodiment are indicated by lines 906 and 908 in graph 900. Line 906 in graph 900 illustrates an example of maximum source impedance phase versus frequency for a regulated transformer rectifier unit in accordance with an illustrative embodiment. Line 908 in graph 900 indicates an example of minimum source impedance phase versus frequency for a regulated transformer rectifier unit in accordance with an illustrative embodiment.

Figure 10:
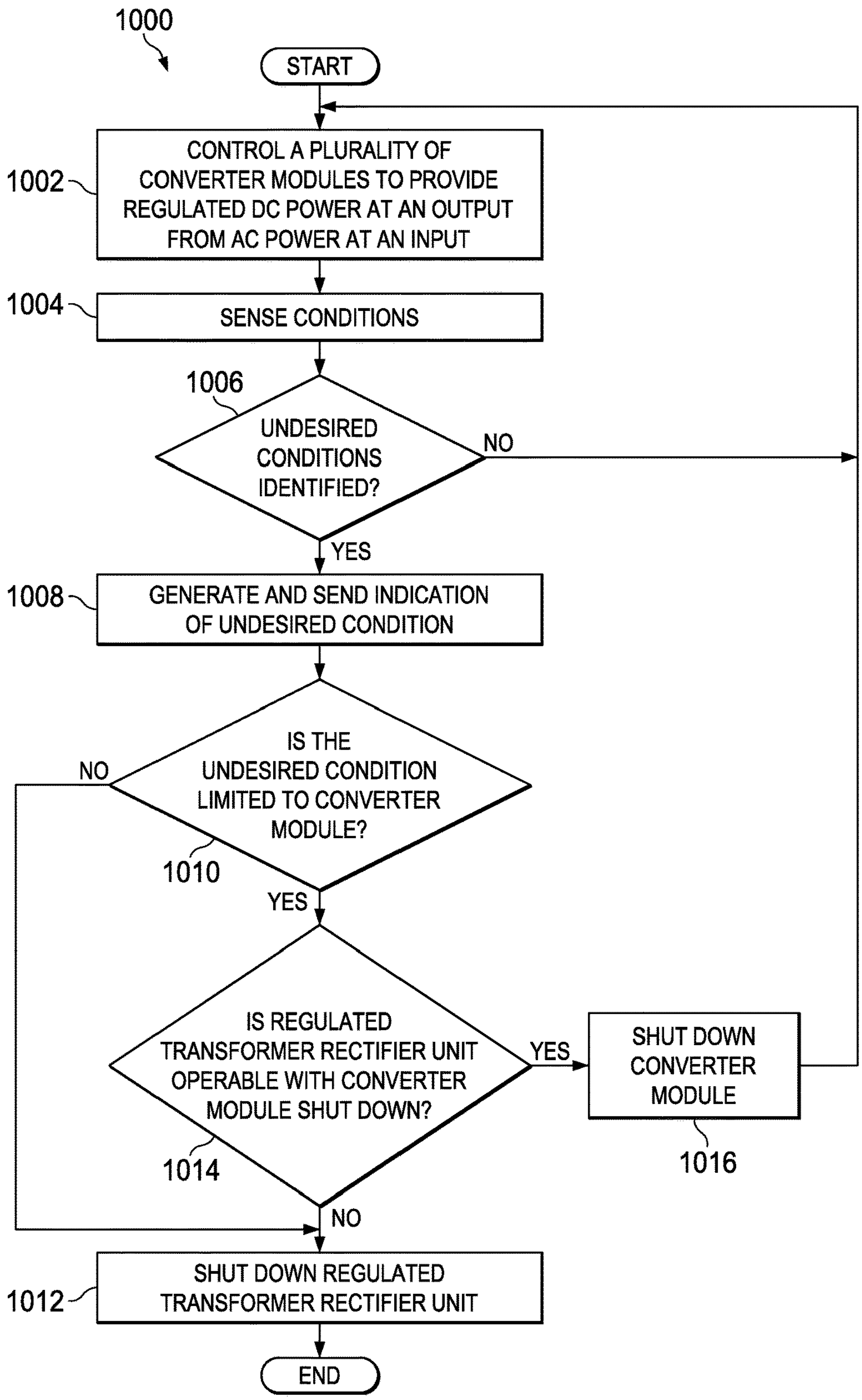
FIG. 10 is an illustration of a flowchart of a process for providing regulated direct current power in accordance with an illustrative embodiment.

Turning to FIG. 10, an illustration of a flowchart of a process for providing regulated direct current power is depicted in accordance with an illustrative embodiment. Process 1000 may be performed, for example, by controller 400 in FIG. 4.

Process 1000 may begin with controlling a plurality of converter modules to provide regulated DC power at an output from AC power at an input (operation 1002). Conditions in the plurality of converter modules may be sensed (operation 1004). It then may be determined from the sensed conditions whether an undesired condition is identified (operation 1006). If an undesired condition is not identified, process 1000 may return to operation 1002.

When an undesired condition is identified at operation 1006, an indication of the undesired condition may be generated and sent (operation 1008). It then may be determined whether the undesired condition is limited to one of the plurality of converter modules (operation 1010). If the undesired condition is not limited to one of the converter modules, the regulated transformer rectifier unit may be shut down (operation 1012), with the process terminating thereafter.

When it is determined at operation 1010 that the undesired condition is limited to a converter module, it may then be determined whether the regulated transformer rectifier unit is operable to provide acceptable regulated DC power with the affected converter module shut down (operation 1014). If the regulated transformer rectifier unit is not operable with converter module shut down, process 1000 proceeds to shut down the regulated transformer rectifier unit at operation 1012, with the process terminating thereafter. When it is determined at operation 1014 that the regulated transformer rectifier unit is operable with the converter module shut down, the converter module may be shut down (operation 1016), and process 1000 may continue with operation 1002.

Figure 11:
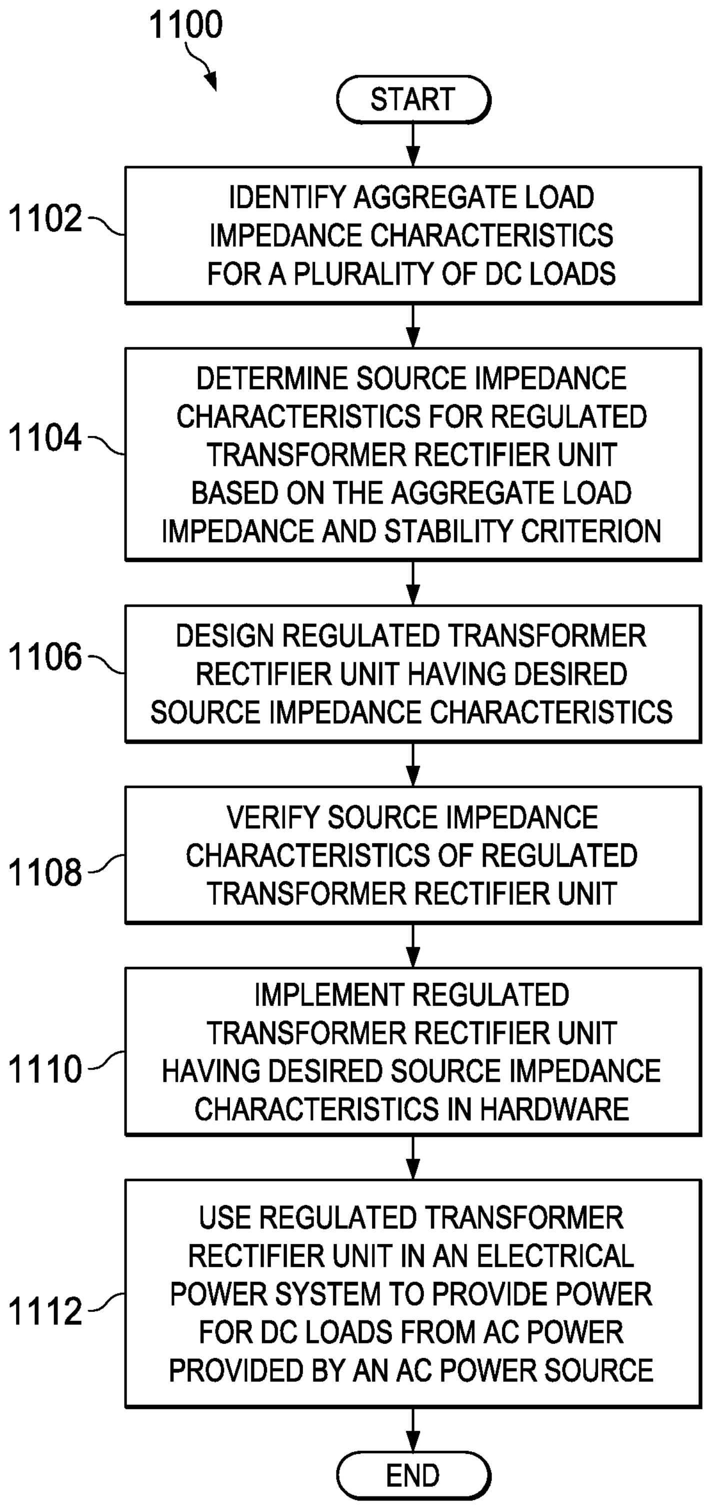
FIG. 11 is an illustration of a flowchart of a process for stably providing power with a regulated transformer rectifier unit in accordance with an illustrative embodiment.

Turning to FIG. 11, an illustration of a flowchart of a process for stably providing power with a regulated transformer rectifier unit is depicted in accordance with an illustrative embodiment. Process 1100 may be used, for example, to implement stable 156 electrical power system 100 with regulated transformer rectifier unit 132 in FIG. 1.

Process 1100 may begin with identifying aggregate load impedance characteristics for a plurality of DC loads (operation 1102). The plurality of DC loads may include active loads, passive loads, or any appropriate number and combination of active loads and passive loads. The aggregate load impedance characteristics may be identified using simulation under various operating conditions and may be validated by hardware testing.

Source impedance characteristics for a regulated transformer rectifier unit then may be determined based on the aggregate load impedance for the DC loads and stability criterion (operation 1104). For example, the source impedance characteristics for the regulated transformer rectifier unit that are determined based on the aggregate load impedance for the DC loads and the stability criterion may include source impedance magnitude limits and source impedance phase limits. For example, without limitation, the stability criterion used to determine the source impedance characteristics for the regulated transformer rectifier unit may include Nyquist criterion or other appropriate criterion or combination of stability criteria.

A regulated transformer rectifier unit having the desired source impedance characteristics then may be designed (operation 1106). The source impedance characteristics of the regulated transformer rectifier unit may be verified (operation 1108). For example, the source impedance characteristics may be validated by simulation.

The regulated transformer rectifier unit having the desired source impedance characteristics then may be implemented in hardware (operation 1110). The regulated transformer rectifier unit then may be used in an electrical power system to provide power for DC loads from AC power provided by an AC power source (operation 1112) with the process terminating thereafter.

Figure 12:
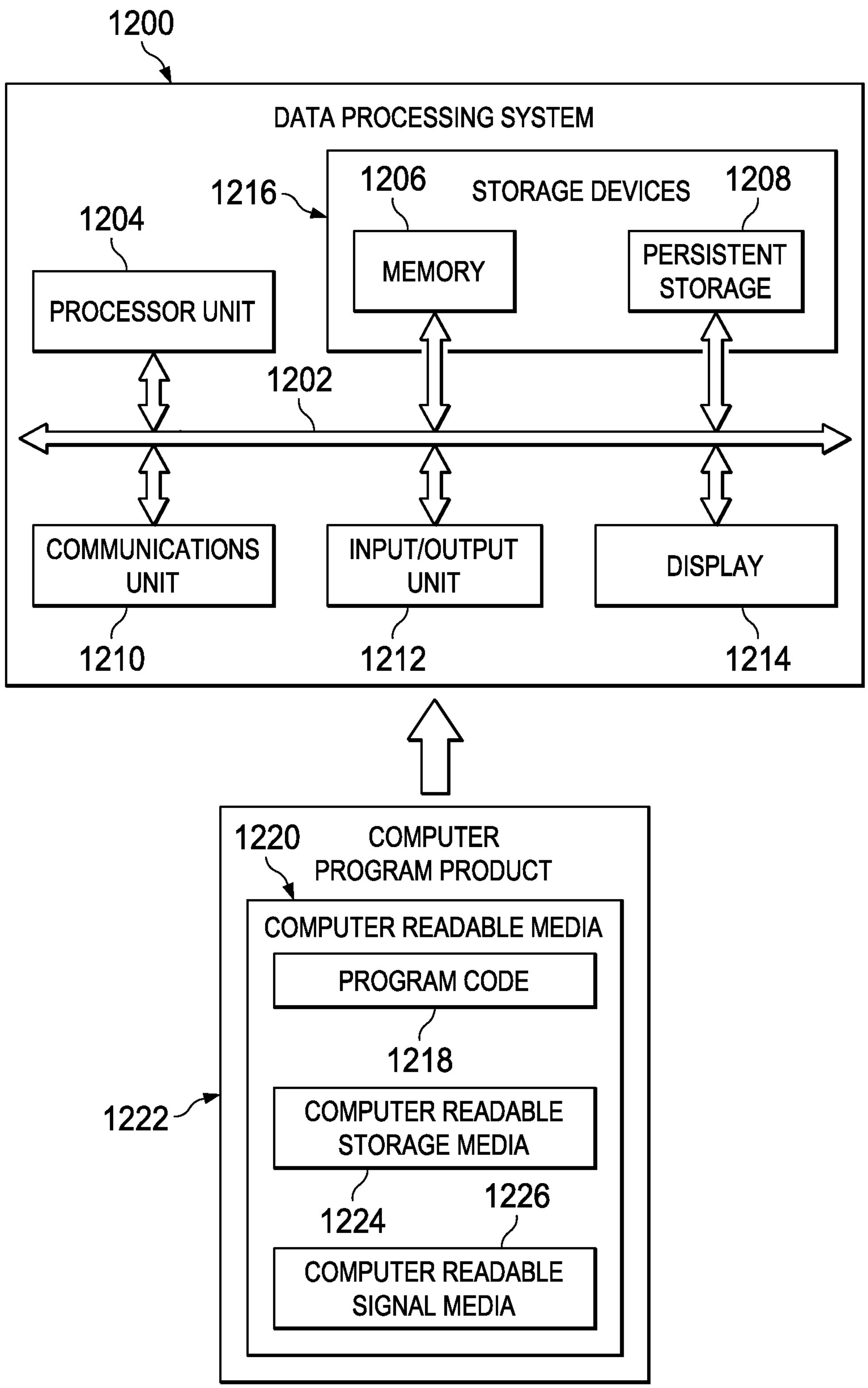
FIG. 12 is an illustration of a block diagram of a data processing system in accordance with an illustrative embodiment.

Turning now to FIG. 12, an illustration of a block diagram of a data processing system is depicted in accordance with an illustrative embodiment. In this example, data processing system 1200 is an example of one implementation of a data processing system for implementing controller 142 or power system controller 152 in FIG. 1.

In this illustrative example, data processing system 1200 includes communications fabric 1202. Communications fabric 1202 provides communications between processor unit 1204, memory 1206, persistent storage 1208, communications unit 1210, input/output (I/O) unit 1212, and display 1214. Memory 1206, persistent storage 1208, communications unit 1210, input/output (I/O) unit 1212, and display 1214 are examples of resources accessible by processor unit 1004 via communications fabric 1202.

Processor unit 1204 serves to run instructions for software that may be loaded into memory 1206. Processor unit 1204 may be a number of processors, a multi-processor core, or some other type of processor, depending on the particular implementation. Further, processor unit 1204 may be implemented using a number of heterogeneous processor systems in which a main processor is present with secondary processors on a single chip. As another illustrative example, processor unit 1204 may be a symmetric multi-processor system containing multiple processors of the same type.

Memory 1206 and persistent storage 1208 are examples of storage devices 1216. A storage device is any piece of hardware that is capable of storing information, such as, for example, without limitation, data, program code in functional form, and other suitable information either on a temporary basis or a permanent basis. Storage devices 1216 also may be referred to as computer readable storage devices in these examples. Memory 1206, in these examples, may be, for example, a random access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these examples, provides for communications with other data processing systems or devices. In these examples, communications unit 1210 is a network interface card. Communications unit 1210 may provide communications through the use of either or both physical and wireless communications links.

Input/output (I/O) unit 1212 allows for input and output of data with other devices that may be connected to data processing system 1200. For example, input/output (I/O) unit 1212 may provide a connection for user input through a keyboard, a mouse, and/or some other suitable input device. Further, input/output (I/O) unit 1212 may send output to a printer. Display 1214 provides a mechanism to display information to a user.

Instructions for the operating system, applications, and/or programs may be located in storage devices 1216, which are in communication with processor unit 1204 through communications fabric 1202. In these illustrative examples, the instructions are in a functional form on persistent storage 1208. These instructions may be loaded into memory 1206 for execution by processor unit 1204. The processes of the different embodiments may be performed by processor unit 1204 using computer-implemented instructions, which may be located in a memory, such as memory 1206.

These instructions are referred to as program instructions, program code, computer usable program code, or computer readable program code that may be read and executed by a processor in processor unit 1204. The program code in the different embodiments may be embodied on different physical or computer readable storage media, such as memory 1206 or persistent storage 1208.

Program code 1218 is located in a functional form on computer readable media 1220 that is selectively removable and may be loaded onto or transferred to data processing system 1200 for execution by processor unit 1204. Program code 1218 and computer readable media 1220 form computer program product 1222 in these examples. In one example, computer readable media 1220 may be computer readable storage media 1224 or computer readable signal media 1226.

Computer readable storage media 1224 may include, for example, an optical or magnetic disk that is inserted or placed into a drive or other device that is part of persistent storage 1208 for transfer onto a storage device, such as a hard drive, that is part of persistent storage 1208. Computer readable storage media 1224 also may take the form of a persistent storage, such as a hard drive, a thumb drive, or a flash memory, that is connected to data processing system 1200. In some instances, computer readable storage media 1224 may not be removable from data processing system 1200.

In these examples, computer readable storage media 1224 is a physical or tangible storage device used to store program code 1218 rather than a medium that propagates or transmits program code 1218. Computer readable storage media 1224 is also referred to as a computer readable tangible storage device or a computer readable physical storage device. In other words, computer readable storage media 1224 is a media that can be touched by a person.

Alternatively, program code 1218 may be transferred to data processing system 1200 using computer readable signal media 1226. Computer readable signal media 1226 may be, for example, a propagated data signal containing program code 1218. For example, computer readable signal media 1226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1218 may be downloaded over a network to persistent storage 1208 from another device or data processing system through computer readable signal media 1226 for use within data processing system 1200. For instance, program code stored in a computer readable storage medium in a server data processing system may be downloaded over a network from the server to data processing system 1200. The data processing system providing program code 1218 may be a server computer, a client computer, or some other device capable of storing and transmitting program code 1218.

The different components illustrated for data processing system 1200 are not meant to provide architectural limitations to the manner in which different embodiments may be implemented. The different illustrative embodiments may be implemented in a data processing system including components in addition to and/or in place of those illustrated for data processing system 1200. Other components shown in FIG. 12 can be varied from the illustrative examples shown. The different embodiments may be implemented using any hardware device or system capable of running program code. As one example, data processing system 1200 may include organic components integrated with inorganic components and/or may be comprised entirely of organic components excluding a human being. For example, a storage device may be comprised of an organic semiconductor.

In another illustrative example, processor unit 1204 may take the form of a hardware unit that has circuits that are manufactured or configured for a particular use. This type of hardware may perform operations without needing program code to be loaded into a memory from a storage device to be configured to perform the operations.

For example, when processor unit 1204 takes the form of a hardware unit, processor unit 1204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1218 may be omitted, because the processes for the different embodiments are implemented in a hardware unit.

In still another illustrative example, processor unit 1204 may be implemented using a combination of processors found in computers and hardware units. Processor unit 1204 may have a number of hardware units and a number of processors that are configured to run program code 1218. With this depicted example, some of the processes may be implemented in the number of hardware units, while other processes may be implemented in the number of processors.

In another example, a bus system may be used to implement communications fabric 1202 and may be comprised of one or more buses, such as a system bus or an input/output bus. Of course, the bus system may be implemented using any suitable type of architecture that provides for a transfer of data between different components or devices attached to the bus system.

Additionally, communications unit 1210 may include a number of devices that transmit data, receive data, or both transmit and receive data. Communications unit 1210 may be, for example, a modem or a network adapter, two network adapters, or some combination thereof. Further, a memory may be, for example, memory 1206, or a cache, such as that found in an interface and memory controller hub that may be present in communications fabric 1202.

Figure 13:
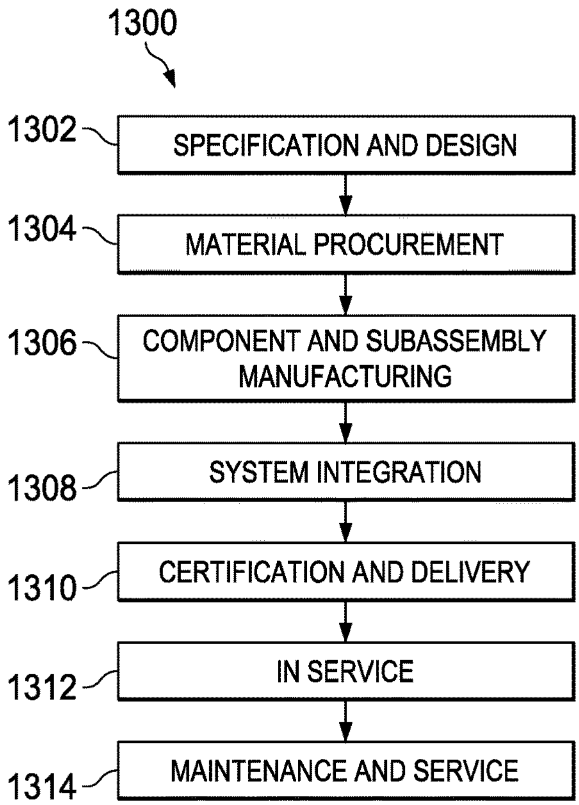
FIG. 13 is an illustration of a block diagram of an aircraft manufacturing and service method in accordance with an illustrative embodiment.
Figure 14:
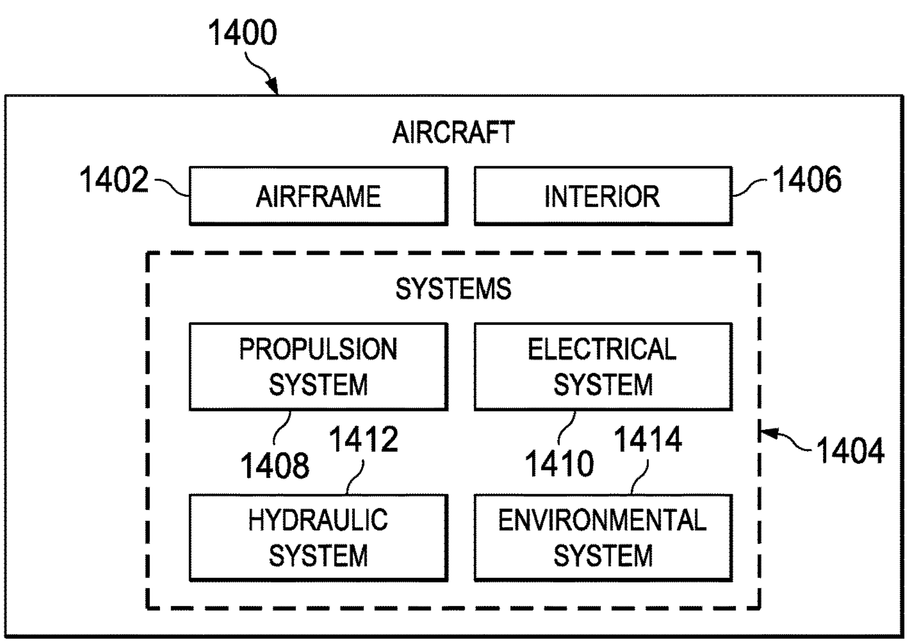
FIG. 14 is an illustration of a block diagram of an aircraft in accordance with an illustrative embodiment.

Illustrative embodiments of the disclosure may be described in the context of aircraft manufacturing and service method 1300 as shown in FIG. 13 and aircraft 1400 as shown in FIG. 14. Turning first to FIG. 13, an illustration of a block diagram of an aircraft manufacturing and service method is depicted in accordance with an illustrative embodiment.

During pre-production, aircraft manufacturing and service method 1300 may include specification and design 1302 of aircraft 1400 in FIG. 14 and material procurement 1304. During production, component and subassembly manufacturing 1306 and system integration 1308 of aircraft 1400 in FIG. 14 takes place. Thereafter, aircraft 1400 in FIG. 14 may go through certification and delivery 1310 in order to be placed in service 1312.

While in service by a customer, aircraft 1400 in FIG. 14 may be scheduled for routine maintenance and service 1314, which may include modification, reconfiguration, refurbishment, and other maintenance or service. In this example, aircraft manufacturing and service method 1300 is shown as a method for aerospace vehicles, including manned and unmanned aircraft. The different illustrative embodiments may be applied to other types of manufacturing and service methods, including manufacturing and service methods for other types of platforms, including other types of vehicles.

Each of the processes of aircraft manufacturing and service method 1300 may be performed or carried out by a system integrator, a third party, an operator, or by any combination of such entities. In these examples, the operator may be a customer. For the purposes of this description, a system integrator may include, without limitation, any number of aerospace vehicle manufacturers and major-system subcontractors; a third party may include, without limitation, any number of venders, subcontractors, and suppliers; and an operator may be a company, a military entity, a service organization, and so on.

With reference now to FIG. 14, an illustration of a block diagram of an aircraft in which an illustrative embodiment may be implemented is depicted. In this illustrative example, aircraft 1400 may be produced by aircraft manufacturing and service method 1300 in FIG. 13. Aircraft 1400 may include an aircraft, a spacecraft, or any other aerospace vehicle configured for traveling through the air, for traveling through space, or which is capable of operation in both air and space. Aircraft 1400 may include airframe 1402 with systems 1404 and interior 1406. Examples of systems 1404 include one or more of propulsion system 1408, electrical power system 1410, hydraulic system 1412, and environmental system 1414.

Apparatuses and methods embodied herein may be employed during at least one of the stages of aircraft manufacturing and service method 1300 in FIG. 13. As used herein, the phrase “at least one of,” when used with a list of items, means that different combinations of one or more of the listed items may be used and only one of each item in the list may be needed. For example, “at least one of item A, item B, and item C” may include, for example, without limitation, item A, or item A and item B. This example also may include item A, item B, and item C, or item B and item C. The item may be a particular object, thing, or a category. In other words, at least one of means any combination of items and number of items may be used from the list but not all of the items in the list are required.

In one illustrative example, components or subassemblies produced in component and subassembly manufacturing 1306 in FIG. 13 may be fabricated or manufactured in a manner similar to components or subassemblies produced while aircraft 1400 in FIG. 14 is in service 1312 in FIG. 13. As yet another example, a number of apparatus embodiments, method embodiments, or a combination thereof may be utilized during production stages, such as component and subassembly manufacturing 1306 and system integration 1308 in FIG. 13. A number of apparatus embodiments, method embodiments, or a combination thereof may be utilized while aircraft 1400 is in service 1312, during maintenance and service 1314, or both. For example, illustrative embodiments may be used to design, implement, and operate a stable electrical power system 1410 for aircraft 1400.

The use of a number of the different illustrative embodiments may substantially expedite the assembly of aircraft 1400. A number of the different illustrative embodiments may reduce the cost of aircraft 1400. For example, one or more of the different illustrative embodiments may be used during specification and design 1302 or during other production stages. The different illustrative embodiments may be used during various parts of aircraft manufacturing and service method 1300 to design, implement, and operate a stable electrical power system 1410 for aircraft 1400.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description and is not intended to be exhaustive or to limit the embodiments in the form disclosed. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus on an aircraft, comprising:
- an input configured to receive alternating current power from an alternating current power source on the aircraft;
- an output;
- a plurality of converter modules connected in parallel to the input and the output, wherein each converter module in the plurality of converter modules comprises a regulated transformer rectifier unit; and
- a controller configured to:
  - control each of the plurality of converter modules to provide regulated direct current power at the output from the alternating current power at the input,
  - identify an undesired condition in a one of the plurality of converter modules,
  - shut down the one of the plurality of converter modules in response to identifying the undesired condition, and
  - control another one of the plurality of converter modules to provide the regulated direct current power at the output while the one of the plurality of converter modules is shut down.

2. The apparatus of claim 1, wherein the alternating current power comprises variable frequency alternating current power.

3. The apparatus of claim 1, wherein the alternating current power comprises three-phase alternating current power.

4. The apparatus of claim 1, wherein the alternating current power comprises 100 volts root mean square to 300 volts root mean square and the regulated direct current power comprises a one of 18 volts to 40 volts and 38 volts to 60 volts.

5. The apparatus of claim 1, wherein the plurality of converter modules comprise six converter modules connected in parallel between the input and the output.

6. The apparatus of claim 1, wherein the each converter module in the plurality of converter modules comprises a delta-connected line-to-line rectifier.

7. The apparatus of claim 1 further comprising:
- an input filter connected between the input and the plurality of converter modules; and
- an output filter connected between the plurality of converter modules and the output; wherein
- the input filter and the output filter comprise electromagnetic interference filters configured to reduce switching noise.

8. The apparatus of claim 7, wherein the output filter is configured to provide lightning protection.

9. The apparatus of claim 1, wherein the controller is configured to:
- provide an indication in response to identifying the undesired condition.

10. The apparatus of claim 1, wherein the undesired condition is selected from the group of undesired conditions consisting of an over-temperature in the one of the plurality of converter modules, an over-current in the one of the plurality of converter modules, and excessive current ripple in the one of the plurality of converter modules.

11. The apparatus of claim 1 further comprising:
- active cooling and passive cooling.

12. The apparatus of claim 1 further comprising:
- hold-up circuitry configured to operate with a battery to recover direct current power at the output within approximately 10 milliseconds following an interruption of the alternating current power.

13. The apparatus of claim 1, wherein the controller is configured to control the plurality of converter modules to provide the regulated direct current power for a number of direct current loads on the aircraft.

14. A method of providing regulated direct current power for a direct current load on an aircraft, comprising:
- controlling each of a plurality of converter modules to provide the regulated direct current power at an output from alternating current power at an input, wherein the plurality of converter modules are connected in parallel to the input and the output, and wherein each converter module in the plurality of converter modules comprises a regulated transformer rectifier unit;

identifying an undesired condition in a one of the plurality of converter modules;

shutting down the one of the plurality of converter modules in response to identifying the undesired condition; and controlling another one of the plurality of converter modules to provide the regulated direct current power at the output while the one of the plurality of converter modules is shut down.

15. The method of claim 14 further comprising:

sending an indication to a flight deck of the aircraft in response to identifying the undesired condition.

16. An apparatus, comprising a plurality of regulated transformer rectifier units connected in parallel to provide regulated direct current power for a direct current load, wherein each of the plurality of regulated transformer rectifier units comprises:

an input configured to receive alternating current power from an alternating current power source;

an output;

a plurality of converter modules connected in parallel to the input and the output, wherein each converter module in the plurality of converter modules comprises a transformer rectifier unit; and a controller configured to control each of the plurality of converter modules to provide the regulated direct current power at the output from the alternating current power at the input, identify an undesired condition in a one of the plurality of converter modules, shut down the one of the plurality of converter modules in response to identifying the undesired condition, and control another one of the plurality of converter modules to provide the regulated direct current power at the output while the one of the plurality of converter modules is shut down.

* * * * *